United States Patent [19]
Rice

[11] Patent Number: 5,785,077
[45] Date of Patent: Jul. 28, 1998

[54] EASILY REPLACEABLE VALVE

[76] Inventor: Donald C. Rice, 10207 Wildwood La., Klamath Falls, Oreg. 97603

[21] Appl. No.: 749,720

[22] Filed: Nov. 15, 1996

[51] Int. Cl.$^6$ .............................. F16K 43/00; F16K 1/18
[52] U.S. Cl. ........................ 137/315; 137/454.6; 251/298
[58] Field of Search ...................... 137/15, 315, 454.6; 251/305, 308, 298, 301

[56] References Cited

U.S. PATENT DOCUMENTS

| 1,368,970 | 2/1921 | Roberts et al. | 251/298 |
|---|---|---|---|
| 1,442,654 | 1/1923 | Douglas | 251/298 |
| 1,614,117 | 1/1927 | Geldhof | 251/298 |
| 1,647,036 | 10/1927 | Dileo | 251/298 |
| 1,856,138 | 5/1932 | Ruemelin | 251/298 |
| 2,608,203 | 8/1952 | Butler | 251/305 |
| 2,676,604 | 4/1954 | Senna | 251/305 |
| 2,852,037 | 9/1958 | Downing et al. | 251/298 |
| 3,192,613 | 7/1965 | Allen | 29/157.1 |
| 3,315,792 | 4/1967 | Tyndall | 198/213 |
| 3,521,659 | 7/1970 | Seger | 251/298 |
| 3,749,108 | 7/1973 | Long | 137/15 |
| 3,783,893 | 1/1974 | Davison | 137/527.8 |
| 3,799,434 | 3/1974 | Heidacker | 251/305 |
| 3,860,038 | 1/1975 | Forni | 138/94.3 |
| 4,121,607 | 10/1978 | Bader | 137/454.5 |
| 4,213,477 | 7/1980 | Velasquez | 137/15 |
| 4,270,559 | 6/1981 | Wallberg | 137/15 |
| 4,332,271 | 6/1982 | Rohr | 137/315 |
| 5,082,026 | 1/1992 | Smith | 138/94 |
| 5,169,121 | 12/1992 | Blanco | 251/305 |
| 5,458,148 | 10/1995 | Zelczer et al. | 137/315 |
| 5,524,663 | 6/1996 | Walsh et al. | 137/15 |

*Primary Examiner*—George L. Walton
*Attorney, Agent, or Firm*—Chernoff, Vilhauer, McClung & Stenzel

[57] ABSTRACT

An easily replaced valve for a conduit through which materials are transported by a stream of gas. A body housing a valve gate can be fastened to the conduit, where it is held in a required position with respect to an opening defined in the conduit. Strap-like clamps extending around annular flanges located on the ends of the valve body extend around the conduit to fasten the valve in place in the opening. The flanges and side skirts also connected with the valve body fit the outside of the conduit along the margins of the opening. A shoulder defined between the flanges and side skirts and the valve body registers with the margins of the opening to establish the proper location of the valve in the opening. The valve body, flanges, and side skirts may be of molded plastic.

6 Claims, 2 Drawing Sheets

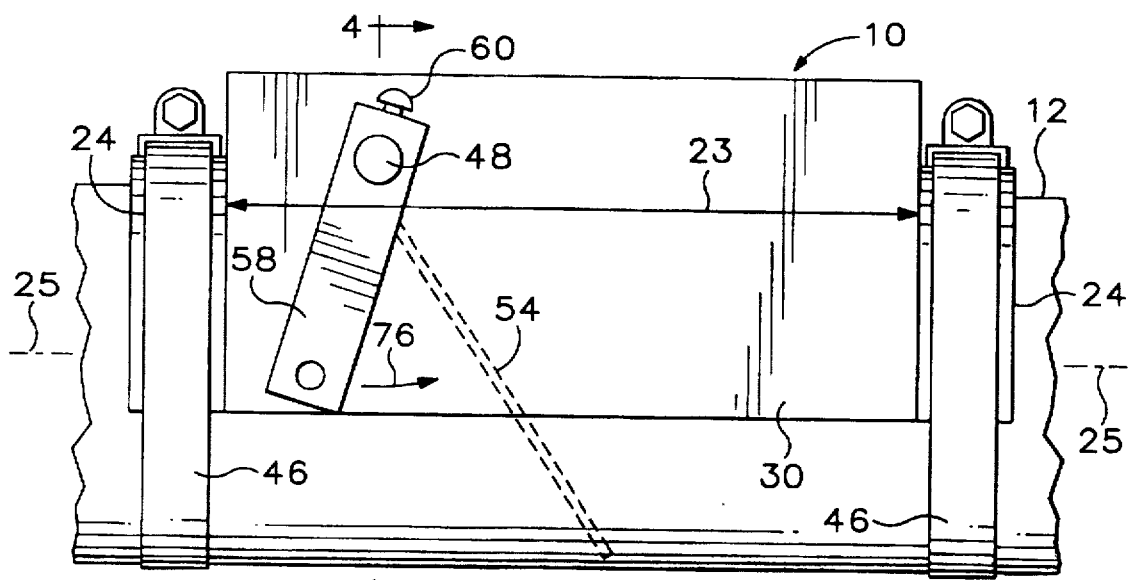
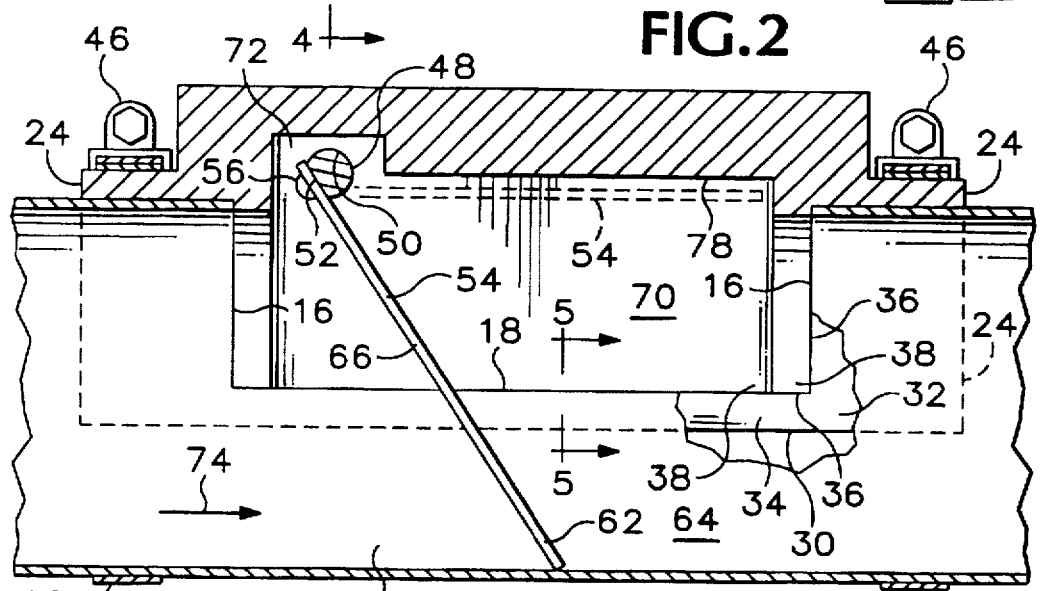
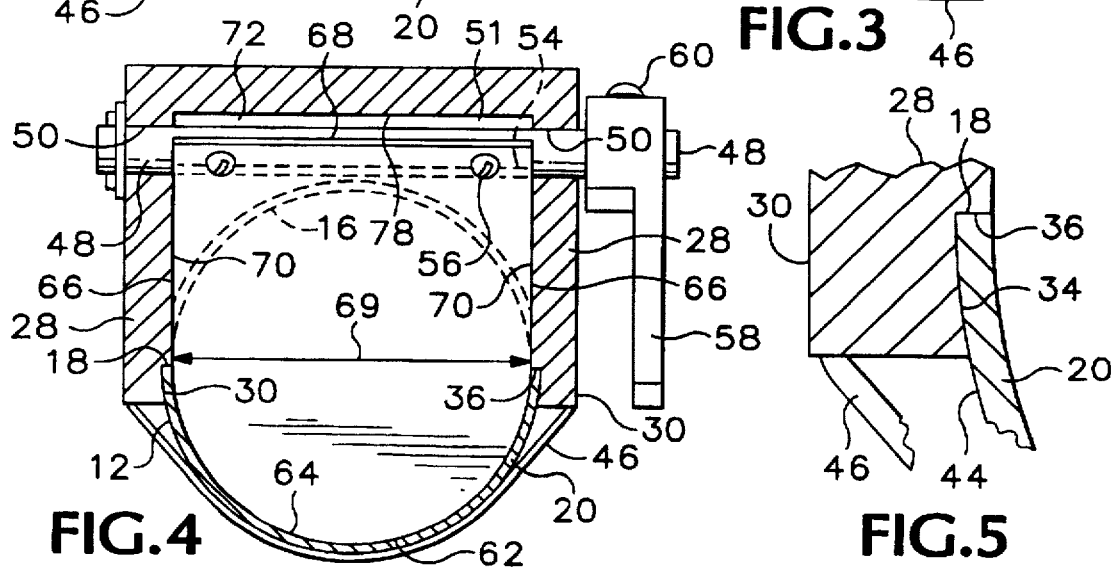

EASILY REPLACEABLE VALVE

BACKGROUND OF THE INVENTION

The present invention relates to valves, and in particular relates to an easily replaceable valve for use in conduits through which particulate materials are to be transported in a stream of gas.

Air spreaders are used in agriculture to distribute either granular fertilizer or seed. Such air spreaders include booms each including several air transport conduits in the form of long tubes through which air under a slightly elevated pressure is blown to carry seed or fertilizer to be discharged through a nozzle at an outer end of each tube. Gate valves are used to close or open the tubes and thus permit or prevent the flow of air and entrained fertilizer or seed.

Fertilizer usually includes some powder, and particularly if it becomes wet, can accumulate as a hard layer on valve surfaces and the surfaces of the interior of conduits through which it moves. Fertilizer may also cause rapid corrosion of metal with which it comes into contact. Valves in prior art air spreader systems are of metal and are constructed as integral parts of the conduits in which they are located. Such valves, because of the environment in which they must function, eventually fail, sometimes because of corrosion, and sometimes because of obstruction of moving parts by accumulated deposits of fertilizer.

Such valve failures have previously required the broken valve and a surrounding portion of the wall of the conduit to be cut out of the conduit, so that a replacement valve could be welded into its place. Such a replacement is a difficult, time-consuming, and costly procedure. Since welding is required, preparation of the surrounding areas of a conduit through which fertilizer had been transported requires precautions to be taken to avoid ignition of fertilizer or other potentially flammable or explosive dust during welding. Because of the difficulty of obtaining access to such valves, repair of a valve has previously been prohibitively costly, and so it is usually necessary to replace a failed valve with an entire new valve, at a significant cost, rather than repairing a valve by replacing failed parts individually. Additionally, the need to weld a replacement valve into a conduit often causes significant delay in repairing inoperative valves, since it is necessary to take an air spreader or other equipment to a welder, or to bring a welder to the equipment in which a valve had failed.

Rohr U.S. Pat. No. 4,332,271, Wallberg U.S. Pat. No. 4,270,559, Velasquez U.S. Pat. No. 4,213,477, and Allen U.S. Pat. No. 3,192,613 all disclose valves which may be added to preexisting pipes without completely severing the pipes. None of these valves, however, can be opened far enough to provide an unobstructed fluid passageway through the interior of the pipe to which they are added.

Long U.S. Pat. No. 3,749,108 discloses another valve which can be added to an existing fluid piping system, but the valve is not able to be controlled as required for systems such as an air spreader system. Similarly, Forni U.S. Pat. No. 3,860,038 discloses a test coupling which can be used to block passage of fluid through a pipe, but which cannot be easily opened and closed.

What is needed, therefore, for use in such air transport conduits and the like, is a valve which can be removed easily, repaired as necessary, and easily replaced, and which functions to close off such a conduit or open it fully for air transport of particulate materials such as fertilizer or seed.

BRIEF SUMMARY OF THE INVENTION

The present invention overcomes the aforementioned shortcomings and disadvantages of the prior art valves for conduits through which particulate material is transported in streams of gas, and provides an answer to the need for a more easily accessible and repairable valve for such conduits, by providing a valve which fits into and covers an opening through a wall of a conduit for transporting particulates in streams of gas. A valve in accordance with the present invention includes a body which houses a valve gate and holds it properly located with respect to the conduit so that the gate can function as desired to stop or permit flow of pressurized gas such as a stream of air carrying particulate material.

Associated with the body of the valve are structures which locate the valve in a preferred embodiment of the invention with respect to the conduit and provide a suitably tight fit of the valve to the conduit. A pair of flanges, located on the ends of the valve, each receive a clamp extending around the conduit to fasten the valve securely in place in a saddle-like arrangement with respect to the conduit.

In a preferred embodiment of the present invention the flanges at either end of the valve body are annular and extend more than halfway around the conduit in which the valve is used, so that the flanges grasp the conduit and resist removal of the valve.

In one embodiment of the present invention side skirts extend between the flanges and rest against exterior surfaces of the conduit along the margins of the opening in which the valve is received.

In a preferred embodiment of the present invention the valve includes a shoulder separating the flanges and the side skirts from the interior of the valve, the shoulder being located so as to fit snugly against the margins of the opening in the conduit, to hold the valve aligned with the conduit so that the valve gate can cooperate with the interior surface of the conduit in which the valve is used.

In one embodiment of the invention the valve body is made by molding a suitably tough material such as a plastic which is not subject to corrosion resulting from contact with chemical fertilizers.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2 is a side elevational view of the valve shown in FIG. 1 installed on the length of pipe shown in FIG. 1.

FIG. 3 is a sectional side view of the valve and pipe combination shown in FIG. 2.

FIG. 4 is a section view of the valve and pipe combination shown in FIG. 2, taken along line 4—4.

FIG. 5 is a fragmentary view, at an enlarged scale, taken along line 5—5 of FIG. 3.

DETAILED DESCRIPTION OF THE INVENTION

Figure 1:
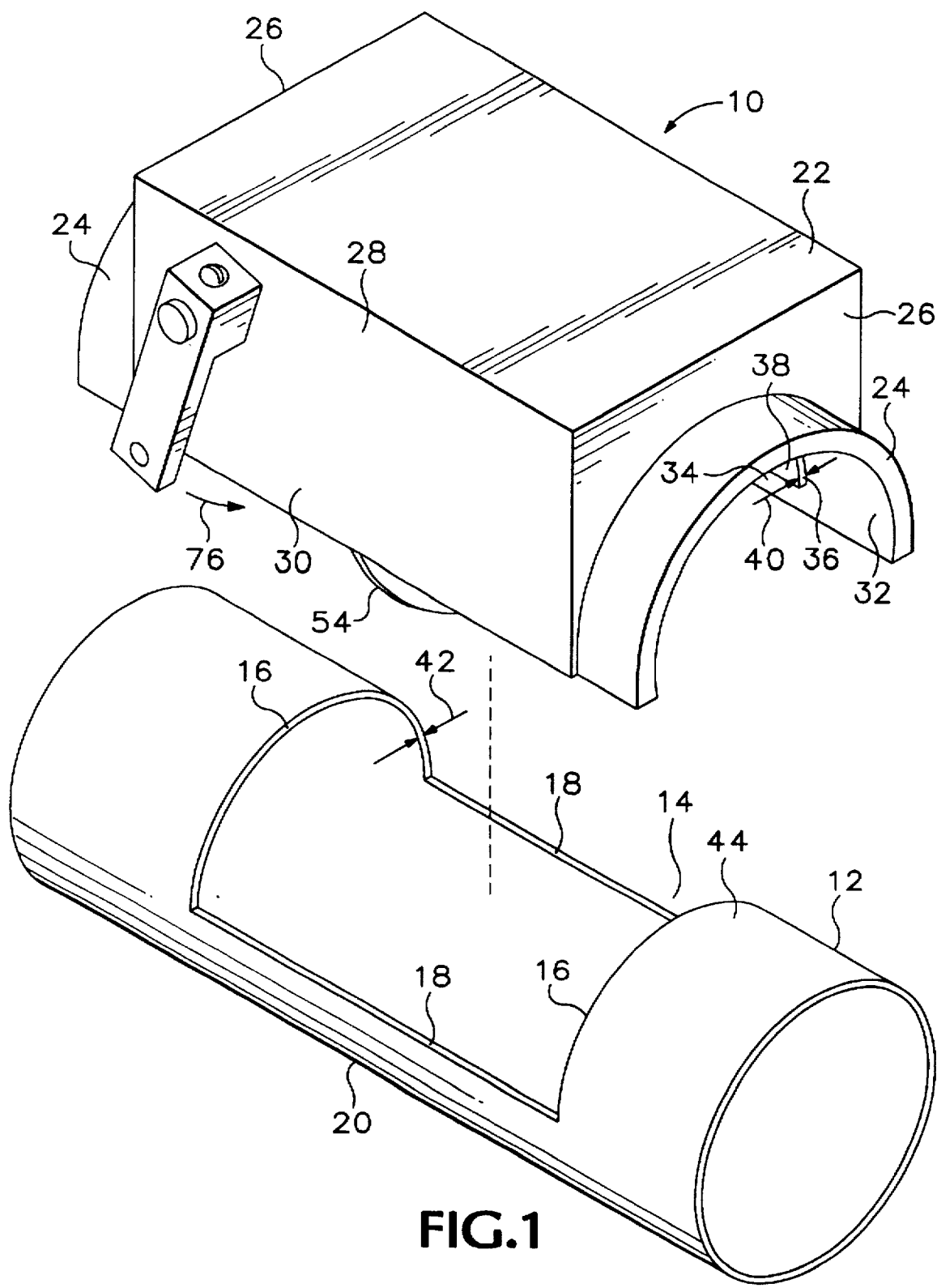
FIG. 1 is a perspective view of a replaceable valve according to the present invention together with a length of pipe prepared to receive the valve.

Referring now to the drawings which form a part of the disclosure herein, a valve 10 according to the present invention is easily installed upon or removed from a pipe 12 in which an opening 14 is defined. Such a pipe 12 may be, for example, one of several conduits used to transport fertilizer in a stream of air as part of an air spreader. Preferably, the opening 14 extends halfway through the pipe 12 and has a length 15, greater than the diameter of the pipe 12, defined by a pair of parallel margins 16 extending around half the circumference of the pipe 12, interconnected by a pair of parallel longitudinal margins 18 leaving intact a portion 20 of the pipe 12 which preferably is semi-cylindrical.

The valve 10 includes a body 22 whose length 23 is aligned with the central axis 25 of the pipe 12. The body 22 has an annular flange 24 extending longitudinally from each of its opposite ends 26. The body 22 also includes a pair of side walls 28 extending upward from a pair of longitudinally-extending side skirt portions 30 which extend longitudinally of the valve body 22 between the flanges 24. The flanges 24 and side skirts 30 thus are a base for the body 22 giving the valve 10 generally a saddle-like configuration.

The flanges 24 are generally annular in shape, preferably extending through more than a semicircle, as may be seen in FIG. 1. The flanges 24 include interior surfaces 32, and the side skirts 30 each include an interior surface 34. A shoulder 36 surrounding an inwardly protruding portion 38 of the interior of the valve body 22 demarcates the side skirts 30 and the flanges 24 with respect to the interior of the valve body 22 and preferably has a height 40 equal to the thickness 42 of the wall of the pipe 12, which may be 1/16 inch, for example. The valve 10 fits on the pipe 12 with the interior surfaces 32 and 34 of the flanges 24 and skirts 30 fitting snugly on an exterior surface 44 of the pipe 12 surrounding the opening 14.

Preferably, although it is not absolutely necessary, the shoulder 36 abuts snugly against the edges of the pipe wall along the margins 16 and 18 defining the opening 14 as shown in FIGS. 3, 4 and 5, functioning as a locator to establish the location of the valve 10 as required with respect to the pipe 12. A pair of clamps 46 similar to hose clamps, each including a metal strap and a threaded screw device for tightening the metal strap, extend circumferentially around the flanges 24 and the pipe 12, one at each end of the valve 10, holding the valve 10 securely in place on the pipe 12.

Since the interior surfaces 32 and 34 are cylindrical in shape, they extend beneath the mid height of the pipe 12, and also help to hold the valve 10 snugly on the pipe. Removal or installation of the valve 10 thus requires that the side skirts 30 and the adjacent lower margins of the flanges 24 be spread apart a small distance in order to pass around the pipe 12.

Preferably, the body 22 of the valve, including the flanges 24 and side skirts 30, is made of a tough, resilient, chemically inert plastics material, such as NSM nylon. Preferably such a plastics material is self-lubricating and resistant to adhesion of fertilizer. The valve body 22 may thus be manufactured by machining suitable material, or by injection molding of a suitable material.

A gate shaft 48 extends through and is rotatable within a pair of aligned bores 50 defined by the side walls 28, which help to define a gate chamber 51 above the base of the valve. Along a portion of the gate shaft 48 between the side walls 28 is a flat side 52 (FIG. 3), and a valve gate 54 is fastened securely to the flat side 52 by fasteners such as screws 56, so that the valve gate 54 rotates with the gate shaft 48. The valve gate 54 is preferably manufactured of a corrosion resistant steel such as a type 304 stainless steel, and the crank 58 and screws 56 are also best made of a similar material. Outside the body 22, a lever or crank 58 is mounted on and fastened to the gate shaft 48 by a set screw 60 to cause the gate shaft 48 to rotate in response to movement of the crank 58.

The valve gate 54 has a semi-elliptical lower margin 62 which fits snugly against the interior surface 64 of the lower portion 20 of the pipe 12 when the valve gate 54 is rotated clockwise, as seen in FIGS. 2 and 3, to the position shown in FIG. 3. Side margins 66 and an upper margin 68 of the valve gate 54 are straight, and the side margins 66 are separated by a width 69 equal to the interior diameter of the pipe 12, to provide a snug fit along the parallel planar inner surfaces 70 of the side walls 28, as shown in FIG. 4. The valve gate 54 in the position shown in FIGS. 3 and 4 thus stops the flow of air through the pipe 12, when the valve 10 is closed. A small flow of air can still move through the space around the gate shaft 48 and the upper margin 68 of the valve gate 54, through the cavity 72 surrounding the gate shaft 48.

To open the valve 10 to permit unobstructed flow through the pipe 12 in the direction indicated by arrow 74, the crank 58 is rotated counterclockwise as indicated by the arrow 76 to move the valve gate 54 to the open position indicated in broken line in FIGS. 3 and 4. In the open position the entire valve gate 54 is substantially horizontal, parallel with the interior surface 78 of the top of the body 22 of the valve 10, but outside the space defined by a projection, or continuation, of the shape of the interior of the pipe 12, as may be seen in FIG. 4.

Because of its construction of an inert material and because of the flanges 24 and side skirts 30 to seal the valve 10 against the exterior surface 44 of the pipe 12, the valve 10 functions well to control the flow of air and entrained seed or fertilizer within the pipe 12. Nevertheless, when fertilizer or other material becomes caked on the valve gate 54, or on the inner surfaces 70 and 78 of the valve body 22, or when other causes result in failure, it is much simpler and easier to repair the valve 10 than to replace a valve of steel construction incorporated within the structure of the pipe 12.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. In combination with a pipe, including a wall having a thickness and defining an opening extending therethrough to an interior of said pipe, a valve comprising:

(a) a valve base having a saddle-like configuration, including a pair of flanges located at opposite ends of said base and a pair of side skirts extending longitudinally of said base and interconnecting said end flanges;

(b) a body mounted on said base and including a pair of side walls defining a gate chamber;

(c) a gate shaft extending between said side walls and mounted for rotation with respect to said side walls;

(d) a valve gate fastened on said gate shaft for rotation therewith, between a closed position in which said gate closes said pipe and an open position in which said gate is located within said gate chamber;

(e) said valve being mounted on said pipe with said flanges and said side skirts in mating relationship with an outer surface of said pipe wall surrounding said opening;

(f) a locator on said valve body extending into said opening and keeping said body and base mated with said pipe in a predetermined position with respect to said opening;

(g) wherein said pipe has an interior and said locator comprises a shoulder raised with respect to an inner surface of said flanges and side skirts, and extending into said opening toward the interior of said pipe.

2. The combination of claim 1 wherein said shoulder has a height equal to said thickness of said wall of said pipe and a shape conforming to a shape of said opening.

3. The combination of claim 1 wherein said body is large enough and said gate shaft is so located that when said gate is in said open position said gate is outside a space defined by a projection of the shape of said interior of said pipe.

4. The combination of claim 1 wherein said base extends more than halfway around said pipe and requires respective portions of said flange and said side skirts to be spread apart during installation of or removal of said valve with respect to said pipe.

5. In combination with a pipe, including a wall having a thickness and defining an opening extending therethrough to an interior of said pipe, a valve comprising:

(a) a valve base having a saddle-like configuration, including a pair of flanges located at opposite ends of said base and a pair of side skirts extending longitudinally of said base and interconnecting said end flanges;

(b) a body mounted on said base and including a pair of side walls defining a gate chamber;

(c) a gate extending between said side walls and mounted for rotation with respect to said side walls;

(d) a valve gate fastened on said gate shaft for rotation therewith, between a closed position in which said gate closes said pipe and an open position in which said gate is located within said gate chamber;

(e) said valve being mounted on said pipe with said flanges and said side skirts in mating relationship with the outer surface of said pipe wall surrounding said opening;

(f) wherein said base extends more than half way around said pipe and respective portions of said flanges and said side skirts are made from a resilient material which permits said portions to be spread apart during installation of or removal of said valve with respect to said pipe.

6. In combination with a pipe, including a wall having a thickness and defining an opening extending therethrough to an interior of said pipe, a valve comprising:

(a) a valve base having a saddle-like configuration, including a pair of flanges located at opposite ends of said base and a pair of side skirts extending longitudinally of said base and interconnecting said end flanges;

(b) a body mounted on said base and including a pair of side walls defining a gate chamber;

(c) a gate shaft extending between said side walls and mounted for rotation with respect to said side walls;

(d) a valve gate fastened on said gate shaft for rotation therewith, between a closed position in which said gate closes said pipe and an open position in which said gate is located within said gate chamber;

(e) wherein said body is large enough and said gate shaft is so located that when said gate is in said open position said gate is outside a space defined by a projection of the shape of said interior of said pipe.

* * * * *